UNITED STATES PATENT OFFICE.

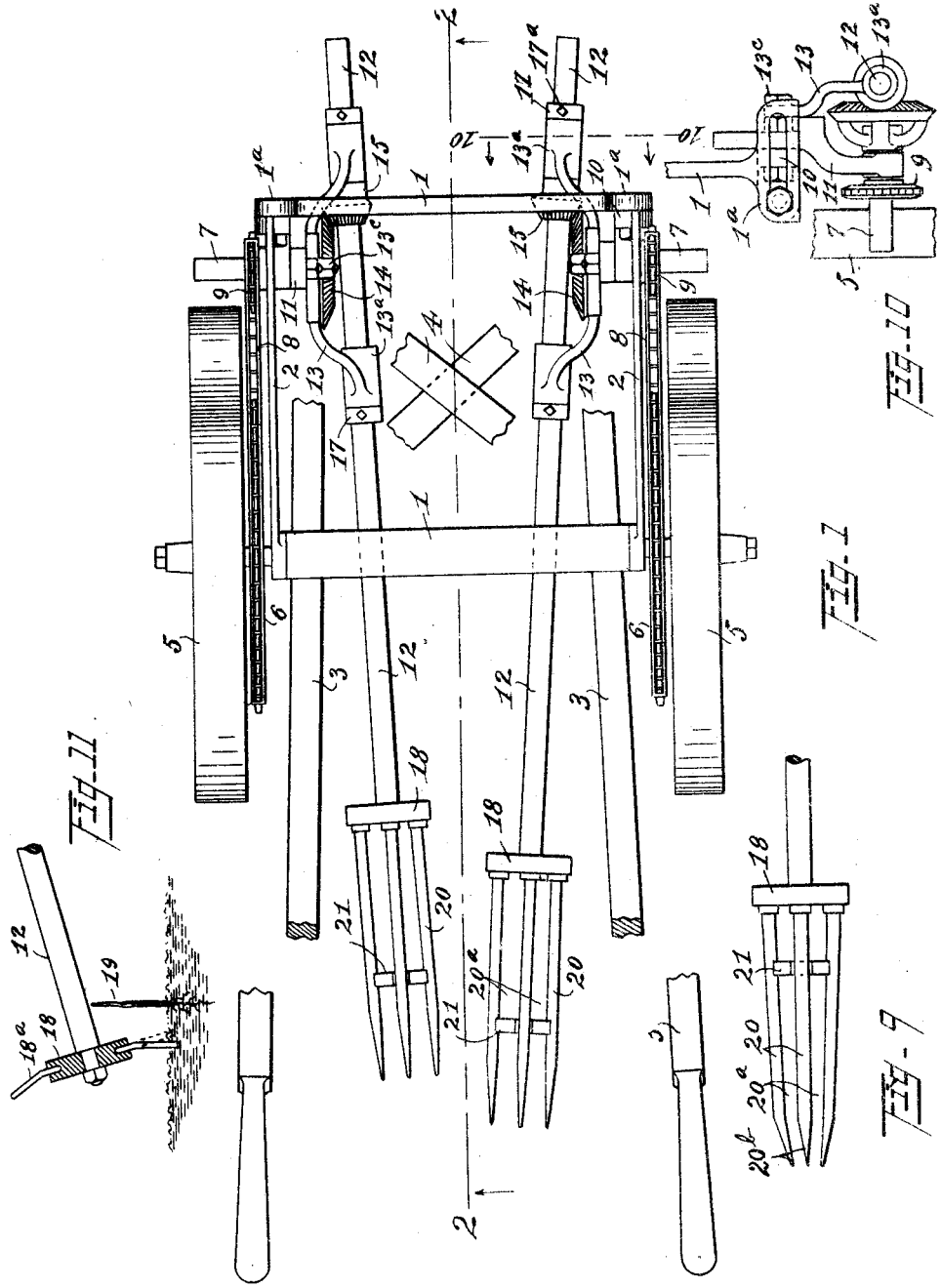

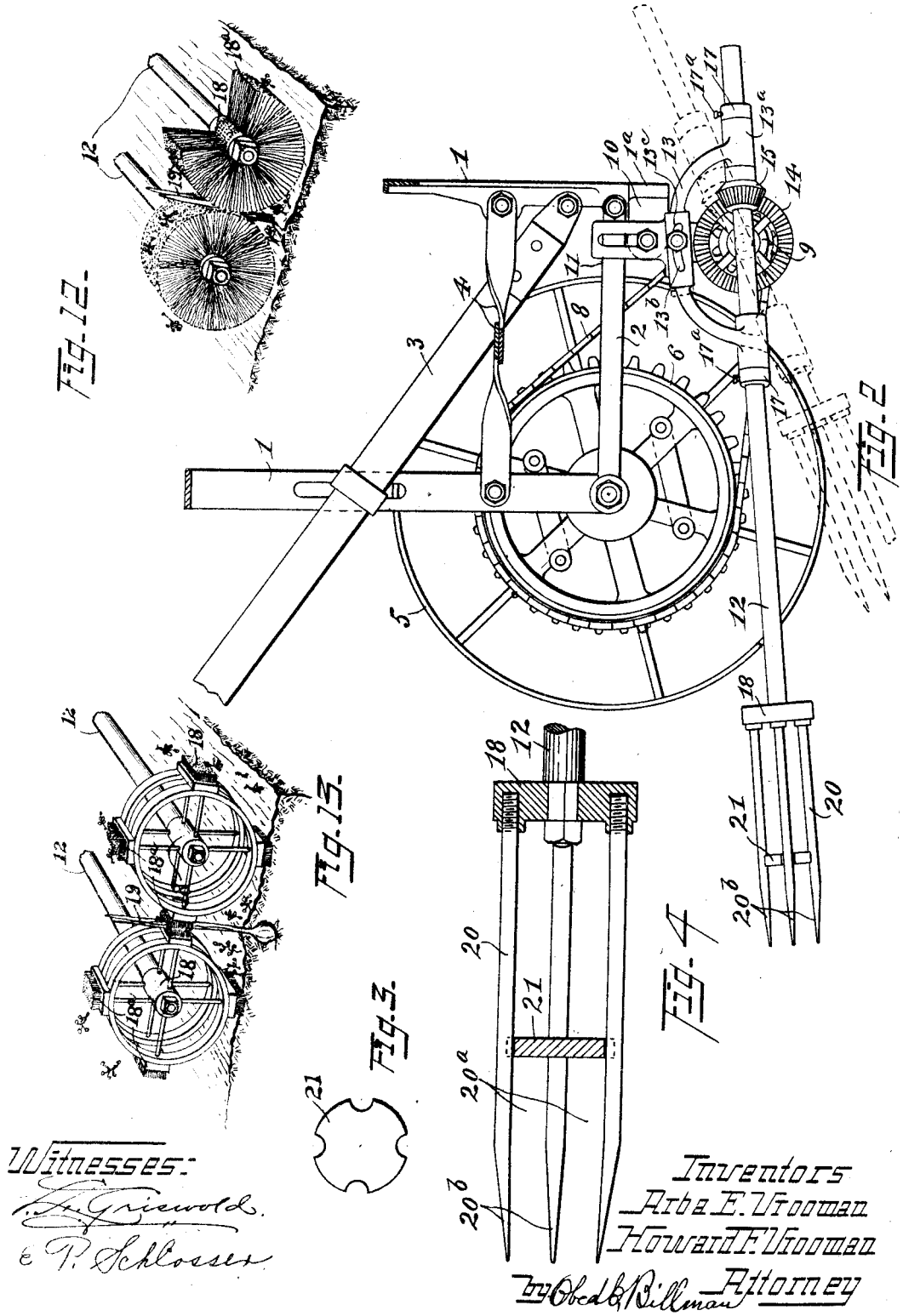

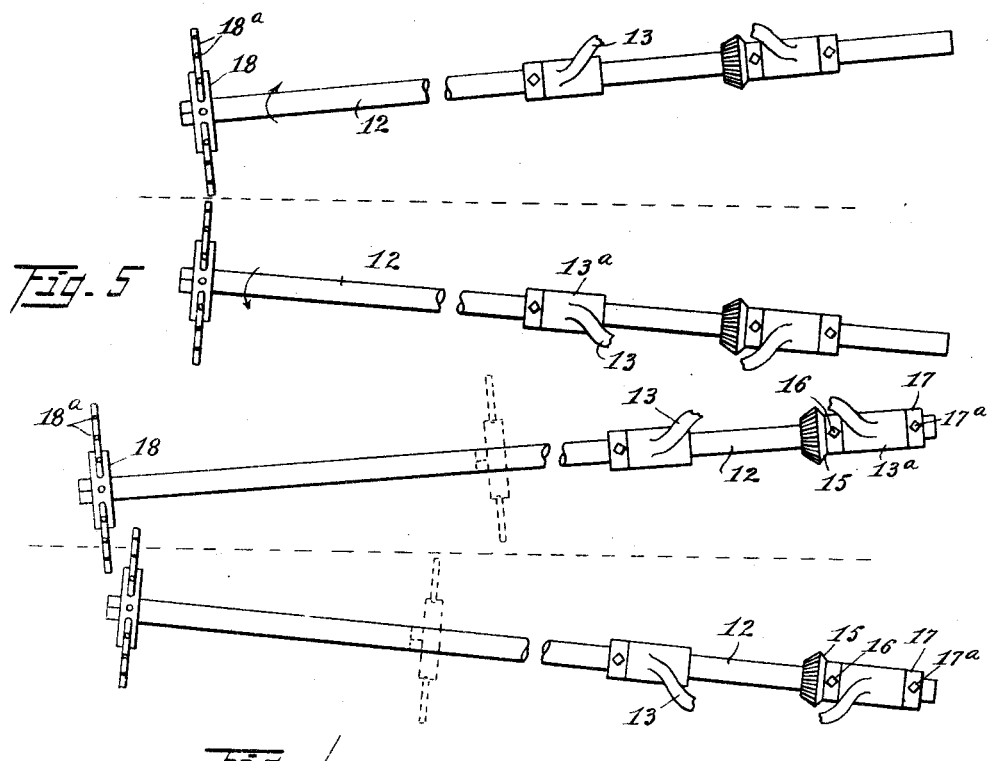
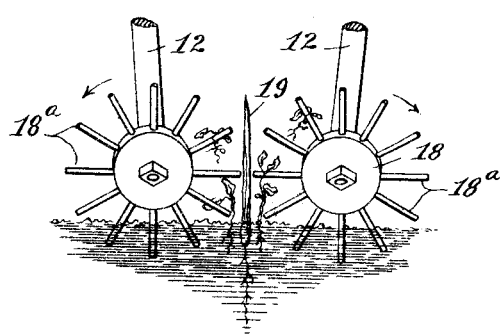
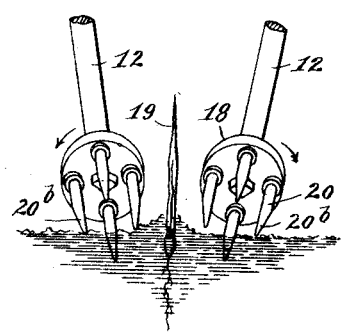

ARBA E. VROOMAN AND HOWARD F. VROOMAN, OF PAINESVILLE, OHIO.

ROTARY WEEDER AND CULTIVATOR.

1,076,398.   Specification of Letters Patent.   Patented Oct. 21, 1913.

Application filed July 6, 1912. Serial No. 707,986.

*To all whom it may concern:*

Be it known that we, ARBA E. VROOMAN and HOWARD F. VROOMAN, citizens of the United States, residing at Painesville, in the county of Lake and State of Ohio, have invented certain new and useful Improvements in Rotary Weeders and Cultivators, of which the following is a specification.

Our invention relates to improvements in rotary weeders and cultivators, the primary object being to provide a generally improved garden implement of this class of exceedingly simple, cheap, and efficient construction, better adapted to its intended purposes than any other device of the same class with which we are acquainted.

The invention relates more particularly to improved rotary weeder or cultivator elements specially designed and adapted for use in the weeding or cultivation of onions and other or similar vegetables, the improved implement being adapted to straddle the rows of growing vegetables, whereby the rotary weeder or cultivator elements may be brought into very close proximity thereto for the purpose of agitating or cultivating the soil along and between the growing plants without in any way injuring the latter, and at the same time destroying the sprouting and growing weeds and avoiding the covering of the cultivated growing plants or vegetables by the loosened soil.

A still further object is to provide improved rotary weeder or cultivator members having their weeder prongs adapted to revolve transversely to the line of travel or draft of the implement and at right angles to the surface being cultivated, or in other words,—parallel with and between the plants or vegetables, thereby reducing the liability of injury to the latter to a minimum, and during the early or initial cultivation of the onions or vegetables allowing one of the rotary cultivator wheels or members to be placed slightly in advance of the other so that the radially extending weeder prongs thereof will slightly overlap and extend into the row of growing vegetables thus enabling the soil between the growing plants to be stirred or cultivated. Practical experience with this implement has demonstrated that this may be done during the initial cultivation of such growing vegetables, as onions, or the like, without injuring the same, particularly as such vegetables are more deeply rooted and of a more hardy character than the young surface weeds.

A still further object is to provide improved driving shafts for carrying the rotary members together with means for supporting and adjusting the same laterally and longitudinally whereby the position of the weeder prongs may be varied and presented at various angles of incidence to the surface being cultivated to meet the various requirements during the various stages of growth and cultivation of the growing crop, said driving or weeder shafts being adapted to support and operate various rotary weeder or cultivator elements as desired.

With the above mentioned and other objects in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is a top plan view of a weeder or cultivator constructed in accordance with this invention, a portion of the frame and handle members being broken away for the purpose of clearer illustration of the parts. Fig. 2, a longitudinal central sectional view taken on line 2—2 of Fig. 1. Fig. 3, a detached view of an adjusting member for adjusting the weeder prongs included in one form of rotary cultivators shown in the accompanying drawings. Fig. 4, an enlarged detail view of an open rotary cultivator member having weeder prongs extending longitudinally of the axis of rotation, said weeder prongs being shown spread apart at their free or active cultivating or soil engaging portions. Fig. 5, a top plan view of the longitudinally and laterally adjustable driving shafts detached and showing one of the adjustments of the rotary weeder members particularly designed for use during the initial cultivation of the vegetables, the dotted lines indicating the row of growing plants and line of travel of the improved cultivator. Fig. 6, a similar view showing the radially extending weeder prongs of the rotary cultivator overlapping or extending into and between the growing plants or vegetables in the row being cultivated. Fig. 7, a rear view of the weeders shown in Fig. 5, and in the adjustment there shown and illustrating the operation of the same in the cultivation of the soil and the destruction of the weeds. Fig. 8, a similar view of a form of rotary cultivator for use in the more advanced growth of the vegetables and of the form shown in Figs. 1, 2, and 4, of the drawings. Fig. 9, a view of the same with the adjusting member adjusted whereby the tapered or active cultivating portions of the weeder prongs are moved in closer proximity to each other. Fig. 10, a detail view of the gearing and adjustable brackets at one side for driving and adjustably supporting one of the driving or weeder shafts taken on line 10—10 of Fig. 1. Fig. 11, a detail side elevation of a further modified form of rotary cultivator in its relation to the surface and plant being cultivated. Fig. 12, a perspective view of a further modified form of rotary cultivator elements and illustrating their operation and relation with respect to the surface and plant being cultivated. Fig. 13, a similar view of a still further modified form of same.

Similar numerals of reference designate like parts throughout all the figures of the drawings.

The improved cultivator comprises a suitable frame which, in the present instance, consists of a pair of arched members 1, connected by means of side members 2, handle members 3, and cross brace members 4.

As a means for supporting and carrying the frame as well as driving the cultivator mechanism hereinafter described, driving wheels 5, are provided, said wheels, in the present instance, being provided with sprocket wheels 6, adapted to transmit motion to sprocket driven shafts 7, in front through the medium of sprocket chains 8, passing over small sprockets 9, on the shafts 7.

As a means for supporting and adjusting the parts whereby the driving or weeder shafts hereinafter referred to may be adjusted longitudinally and laterally for the purposes hereinafter mentioned, the front arch member 1, is provided at its sides with slotted brackets 1ª, (see Fig. 10) each of said brackets 1ª, carrying a laterally adjustable bracket 10, said brackets 10, carrying downwardly extending or depending brackets 11, forming bearings for the gear shaft 7, and as a means for supporting and adjusting the driving or rotary weeder shafts 12, the brackets 11, are provided with shaft supporting brackets 13, the opposite arms of said brackets 13, terminating in bearing heads 13ª, for giving the shafts 12, two points of support, and as a means for tilting or adjusting the driving shafts 12, said brackets 13, are provided with slots 13ᵇ, and adjusting bolts 13ᶜ. The shafts 12, are adapted to receive their motion through the medium of bevel gears 14 and 15, and as a means for permitting of the longitudinal adjustment or shifting of the shafts 12, the gears 15, are adjustably secured to the shafts 12, (in the present instance) by means of set bolts 16, and the shafts 12, are further secured in any desired longitudinal adjusted position by means of bearing collars 17, and screws or bolts 17ª, the arrangement just described permitting of the ready longitudinal adjustment and inclination of the shafts 12, whereby the rotary cultivator elements may be supported and adjusted laterally and longitudinally at various angles of incidence to the surface being cultivated, one of the positions being illustrated in dotted lines in Fig. 2, of the drawings.

During the early or initial cultivation of the growing onions or other similar vegetables we prefer to employ the form of rotary cultivator shown in Figs. 5, 6, and 7, or in Figs. 11, 12, and 13, of the drawings, in which instance, the rotary cultivator comprises a common rotary support 18, carrying a plurality of radially extending weeder prongs or brushes 18ª, said weeder prongs or brushes being adapted to be carried by the shafts 12, at right angles to the surface being cultivated and parallel with the growing onion top or plant 19, it being found by practical experience that on account of the form and hardiness of the latter during its early growth that the action of the weeder prongs or brushes will not materially injure the top or plant 19, and that the small growing or sprouting weeds on the surface of the soil being cultivated will be removed as illustrated in Figs. 7, 12, and 13, of the drawings, the comparative size of the onion top and weeds being slightly exaggerated for the purpose of illustration.

By reason of the arrangement of the bracket and bearing members above described, the shaft and weeder elements may be readily adjusted as indicated in Figs. 2, 5, and 6, of the drawings to meet the varying demands of actual service.

As a later form of rotary weeder for use in a more advanced stage of the growth of the growing onion or similar vegetable, and particularly after the top of the vegetable commences to spread out and slightly overhang the surface being cultivated, the form of rotary cultivator shown in Figs. 1, 2, 4, 8, and 9, may be employed on the shafts 12, said form of rotary cultivator element comprising a rotary support or head 18, carrying longitudinally extending weeder prongs or tines 20, said prongs extending longitudinally to their axis of rotation, forming an open weeder or cultivator member with interstices, gaps, or spaces 20ª, intermediate the prongs or tines 20. The free ends of the prongs or tines 20, are preferably tapered and inturned as at 20ᵇ, said inturned tapered ends 20ᵇ, being adapted to form the active cultivating or soil engaging portions and presenting obvious advantages particularly in connection with the gaps or passes 20ª, between the weeder prongs 20.

As a means for adjusting or moving the tapered or free ends 20ᵇ, of the weeder prongs 20, toward or from each other whereby to decrease or increase the relative diameter of the active cultivating portions of this form of open weeder, suitable adjusting mechanism may be provided, such for example,—as an adjusting block or disk member 21, mounted within and between the tines 20, so that when the member 21, is moved toward the free ends of the prongs 20, the latter will be fully spread apart as indicated in Figs. 1, 2, and 4, of the drawings or when the disk member 21, is moved toward the base ends of the prongs, the free ends of the latter will be permitted to approach each other as indicated in Fig. 9, of the drawings.

In Figs. 12, and 13, we have shown the shafts 12, provided with rotary brushes 18ª, said brushes being likewise adapted to be carried at right angles to the surface being cultivated and being likewise adapted to rotate parallel with the growing onion top or plant 19. The brushes 18ª, may assume any suitable and convenient form, such as the continuous brushes shown in Fig. 12, or the spaced brushes 18ª, as shown in Fig. 13, in which latter instance these brushes are preferably arranged so as to meet each other and rotate in unison, as shown.

From the foregoing description, taken in connection with the accompanying drawings, the operation and advantages of our invention will be readily understood.

Having thus described some of the embodiments of our invention, what we claim and desire to secure by Letters Patent is—

1. In a cultivator, a yoke frame, bearing brackets adjustably carried at the sides of said yoke frame, sprocket driven shafts carried by some of said bearing brackets, rotary weeder shafts carried by the other of said brackets, sprocket mechanism connected to said sprocket driven shafts, and cultivator elements carried by said rotary weeder shafts.

2. In a cultivator, a wheeled yoke frame, bearing brackets adjustably carried at the sides of said yoke frame, sprocket driven shafts carried by some of said brackets, rotary weeder shafts carried by the other of said bearing brackets, and rotary weeder elements carried by said weeder shafts.

3. A cultivator, comprising a frame provided with driving wheels, adjustable bearing brackets, rotary weeder shafts carried thereby and longitudinally adjustable, sprocket mechanism operatively connected to said wheels and said weeder shafts, and pronged weeder members carried by said shafts and adapted to revolve transversely to the line of draft.

4. A cultivator, comprising a frame provided with laterally and longitudinally adjustable bearing brackets, driving shafts and gears carried by said brackets, said driving shafts being longitudinally adjustable independently of said gears, driving wheels operatively connected to said driving shafts and gears, and cultivator elements carried by some of said driving shafts.

5. In a cultivator, a wheeled frame, bearing brackets adjustably carried thereby, driving shafts longitudinally adjustable in said brackets, sprocket driving mechanism for driving said shafts, means for supporting and adjusting said shafts and sprocket driving mechanism independently of each other, and rotary weeder prongs carried by said shafts at right angles to the surface being cultivated.

6. A cultivator, comprising a yoke frame provided with driving wheels, laterally and longitudinally adjustable bearing brackets carried at the sides of said yoke frame, sprocket driven shafts carried by some of said brackets, sprocket chains connecting said sprocket driven shafts to said driving wheels, longitudinally extending rotary weeder shafts carried by some of said brackets, means for longitudinally adjusting said weeder shafts, and rotary weeder members carried by said weeder shafts.

7. In a cultivator, a frame, adjustable bearing brackets carried at the sides of said frame, sprocket shafts and gears carried by some of said brackets, a pair of rotary weeder shafts carried by the other of said brackets, and rotary weeder members removably mounted thereon.

8. In a cultivator, a pair of longitudinally and laterally adjustable rotary weeder shafts, a pair of adjustably mounted bearing brackets carrying said weeder shafts, sprocket mechanism and adjustable sprocket driven shafts for operating said weeder shafts, and rotary weeder elements carried by said weeder shafts in coöperative relation to each other and at right angles to the surface being cultivated.

9. A cultivator, comprising a frame provided with driving shafts, adjustable bearing brackets carried by said frame, sprocket driven shafts mounted in some of said brackets, sprocket mechanism connecting said sprocket driven shafts to said driving wheels, longitudinally extending rotary weeder shafts carried by some of said brackets and longitudinally adjustable independently of said sprocket driven shafts, and rotary weeder members carried by said weeder shafts.

In testimony whereof we have affixed our signatures in presence of two witnesses.

ARBA E. VROOMAN.
HOWARD F. VROOMAN.

Witnesses:
H. E. Downing,
O. C. Billman.